(12) United States Patent
Chang et al.

(10) Patent No.: US 7,052,725 B2
(45) Date of Patent: May 30, 2006

(54) CALCIUM-SUPPLEMENTED BEVERAGES AND METHOD OF MAKING SAME

(75) Inventors: Pei K. Chang, Cortland Manor, NY (US); Thomas D. Lee, Scarsdale, NY (US); John Olszewski, Sandy Hook, CT (US); Brenton G. Edgar, White Plains, NY (US); Richard Orr, Brewster, NY (US); Helen Curtiss, North Salem, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 09/982,180

(22) Filed: Oct. 16, 2001

(65) Prior Publication Data

US 2002/0102331 A1 Aug. 1, 2002

Related U.S. Application Data

(63) Continuation-in-part of application No. 09/688,221, filed on Oct. 16, 2000, now abandoned.

(51) Int. Cl.
*A23L 1/304* (2006.01)
*A23L 2/60* (2006.01)

(52) U.S. Cl. .................... 426/74; 426/548; 426/590

(58) Field of Classification Search ............... 426/74, 426/590, 599, 72, 73, 548
See application file for complete search history.

(56) References Cited

U.S. PATENT DOCUMENTS

| 4,322,407 A | 3/1982 | Ko .................... 424/128 |
| 4,325,975 A | 4/1982 | Lindon et al. .......... 426/66 |
| 4,384,005 A * | 5/1983 | McSweeney ........... 426/590 |
| 4,551,342 A | 11/1985 | Nakel et al. ............ 426/548 |
| 4,722,847 A | 2/1988 | Heckert ................. 426/74 |
| 4,737,375 A | 4/1988 | Nakel et al. ............ 426/590 |
| 4,786,510 A | 11/1988 | Nakel et al. ............ 426/74 |
| 4,830,862 A | 5/1989 | Braun et al. ............ 426/74 |
| 4,851,221 A | 7/1989 | Pak et al. .............. 424/693 |
| 4,872,919 A | 10/1989 | Bucher et al. .......... 134/3 |
| 4,919,963 A | 4/1990 | Heckert ................ 426/599 |
| 4,992,282 A | 2/1991 | Mehansho et al. ....... 426/72 |
| 4,994,283 A | 2/1991 | Mehansho et al. ....... 426/74 |
| 5,032,411 A | 7/1991 | Stray-Gundersen ....... 426/74 |
| 5,075,499 A | 12/1991 | Walsdorf et al. ........ 562/590 |
| 5,114,723 A | 5/1992 | Stray-Gundersen ....... 426/74 |
| 5,118,513 A | 6/1992 | Mehansho et al. ....... 426/2 |
| 5,128,374 A | 7/1992 | Kochanowski ........... 514/574 |
| 5,151,274 A | 9/1992 | Saltman et al. .......... 424/630 |
| 5,186,965 A | 2/1993 | Fox et al. ............. 426/74 |
| 5,225,221 A | 7/1993 | Camden et al. ......... 426/74 |
| 5,232,709 A | 8/1993 | Saltman et al. .......... 424/630 |
| 5,314,919 A | 5/1994 | Jacobs ................. 514/574 |
| 5,389,387 A | 2/1995 | Zuniga et al. .......... 426/74 |
| 5,401,524 A | 3/1995 | Burkes et al. .......... 426/590 |
| 5,422,128 A | 6/1995 | Burkes et al. .......... 426/74 |
| 5,424,082 A | 6/1995 | Dake et al. ............ 426/72 |
| 5,445,837 A | 8/1995 | Burkes et al. .......... 426/74 |
| 5,468,506 A | 11/1995 | Andon ................. 426/74 |
| 5,474,793 A | 12/1995 | Meyer et al. ........... 426/599 |
| 5,817,351 A | 10/1998 | DeWille et al. ......... 426/74 |
| 5,851,578 A | 12/1998 | Gandhi ................ 426/590 |
| 6,080,431 A | 6/2000 | Andon et al. ........... 424/602 |
| 2001/0051197 A1* | 12/2001 | Yang et al. ............ 426/74 |
| 2002/0146486 A1* | 10/2002 | Yang et al. ............ 426/74 |

FOREIGN PATENT DOCUMENTS

| CN | 1264682 | 8/2000 |
| EP | 0 227 174 | 7/1987 |
| EP | 0 244 903 | 11/1987 |
| EP | 0 301 653 | 2/1989 |
| GB | 2 207 335 | 2/1989 |
| JP | 4-271894 | 9/1992 |
| WO | 91/12734 | 9/1991 |
| WO | 92/19251 | 11/1992 |
| WO | 93/25095 | 12/1993 |
| WO | 94/08472 | 4/1994 |
| WO | 98/32344 | 7/1998 |

OTHER PUBLICATIONS

P.J. Varo-Galvan et al., "Caracterizacion Hidroquimica del Agua de Fuentes Naturales n las Comarcas de L'Alcoia y el Comtat (Alicante)", *Alimentarla*, No. 284, pp. 53-59 (1997).
"Nestle Anticipates Growing Emphasis on Functional Food Research", *Nutraceuticals Int'l*, Dec. 1998, pp. 20-21.
G.S. Ranhotra et al., "Bioavailability of Calcium in Breads Fortified with Different Calcium Sources", *Cereal Chem.*, vol. 74, No. 4, pp. 361-363 (1997).
P.T. Packard et al., "Absorbability of Calcium from Calcium Sulfate, a Fortificant", poster, IFT Annual Meeting, Osteoporosis Res. Cent., Creighton Univ., Omaha, Nebraska (1995).
F. Couzy et al., "Calcium Bioavailability from a Calcium- and Sulfate-Rick Mineral Water, Compared with Milk, In Young Adult Women", *Am. J. Clin. Nutr.*, vol. 62, pp. 1239-1244 (1995).

* cited by examiner

*Primary Examiner*—Helen Pratt
(74) *Attorney, Agent, or Firm*—Lars S. Johnson; James D. Ryndak

(57) ABSTRACT

Methods for making artificially sweetened calcium fortified beverages and beverage concentrates, and the stable beverage and beverage concentrates formed thereby; calcium-supplemented beverages and beverage concentrates comprising a unique blend of calcium salts.

86 Claims, No Drawings

CALCIUM-SUPPLEMENTED BEVERAGES AND METHOD OF MAKING SAME

This application is a continuation-in-part of application Ser. No. 09/688,221, filed on Oct. 16, 2000 now abandoned.

FIELD OF THE INVENTION

The present invention relates to methods for making artificially-sweetened, calcium-supplemented beverages and beverage concentrates and the stable beverage and beverage concentrates formed thereby. More particularly, the invention relates to the methods for preparing beverages or beverage concentrates containing calcium salts in a cola beverage matrix, which comprise caramel, acids, artificial sweeteners, flavors and preservatives, or in a juice, tea or water beverage to produce a stable and manufacturable beverage or concentrate with favorable physical and flavor stability and a pleasant taste. The invention also relates to calcium-supplemented beverage concentrates and beverages comprising a unique blend of calcium salts.

BACKGROUND OF THE INVENTION

Calcium supplementation of both beverages and food products is known in the art. Known calcium supplementation techniques employ a variety of calcium sources, insitu calcium salt formation or adjuvants to enhance dietary calcium utilization.

A number of calcium sources have received much attention. Most notably, U.S. Pat. Nos. 4,851,221 and 5,075,499 relate to calcium citrate and di-calcium citrate lactate compounds and related processes. Furthermore, calcium citrate malate has been extensively investigated as evidenced by U.S. Pat. Nos. 5,468,506, 5,445,837, 5,422,128, 5,389,387, 5,314,919, 5,232,709, 5,225,221, 5,186,965, 5,151,274, 5,128,374, 5,118,513, 4,994,283, 4,992,282, 4,919,963, 4,872,919, 4,830,862, 4,786,510, 4,737,375 and 4,722,847.

U.S. Pat. No. 4,830,862 relates to the use of calcium sulfate, preferably in combination with calcium chloride, to improve the solubility of other calcium sources (mainly calcium hydroxide and calcium carbonate), in the presence of significant amounts of edible acids, such as phosphoric and citric acids. The calcium sulfate-chloride combination is said to reduce precipitation and deposition of calcium salts on equipment surfaces during pasteurization.

U.S. Pat. No. 5,474,793 relates to the calcium fortification of ready-to-drink not-from-concentrate fruit juice beverages that are made by recirculation of juice containing citric and malic acids and addition of a powdered calcium salt in an area of turbulent flow. The powdered calcium sources may include hydroxide, carbonate, lactate, phosphate, sulfate, and mixtures thereof.

U.S. Pat. No. 5,401,524 relates to storage stable calcium fortified pre-mixes for beverage concentrate production. Sulfate is listed as one of several possible acidic anions. The pre-mixes also contain citric and malic acids and have a pH less than or equal to 3.5.

Various approaches also have been tried to supplement carbonated soft drinks with calcium. U.S. Pat. No. 4,551,342 is directed to a beverage with sugar and/or artificial sweeteners, an acid blend consisting of citric, malic and phosphoric acid, and a flavor of either fruit or botanical and a cation compound consisting of calcium, magnesium, and potassium. U.S. Pat. No. 5,851,578 describes a formulation of a clear beverage containing soluble fiber and a soluble salt of calcium and other mineral supplements. U.S. Pat. No. 5,817,351 describes the use of calcium glycerophosphate in a low pH (2.8 to 4.6) beverage without product stability problems and unpleasant flavors. U.S. Pat. Nos. 5,474,793 and 5,468,506 describe the use of calcium and acid mixtures (citric acid, calcium hydroxide, and malic acid) to form soluble calcium for fortification of juice type beverages. However, most of these inventions are related to fruit juice based beverages. Either the calcium salts or the acid mixtures, sweeteners and flavors described in these inventions cannot be directly added into a beverage matrix without any modifications for a cola type of beverage. In particular, the type of acids used such as malic acid is highly incompatible to the cola taste.

It has been discovered, however, that calcium-supplemented beverages and beverage concentrates, in particular cola-flavored beverages, prepared according to the methods disclosed in the art and employing artificial sweeteners do not result in stable, palatable beverage compositions. The present invention solves this problem by providing a method of making artificially-sweetened, calcium-supplemented beverages that are stable from calcium precipitation and have a desirable taste.

Therefore, an object of the present invention is to provide a method of making syrups and beverages, as well as the improved syrups and beverages made thereby, that are desirable both for stability and for taste, and which contain calcium, acids, sweeteners and flavors. The formulated beverage products of the invention are useful as calcium-supplemented beverages for consumers who are concerned about calcium deficiency in their diets.

Additional approaches to providing calcium salts in beverages is to use a blend of several calcium salts. For example, a blend of calcium hydroxide and citric acid and malic acid (i.e. calcium citrate and calcium malate) has been used in calcium fortified Tropicana® orange juice, and a blend of calcium hydroxide, calcium chloride, and calcium sulfate as depicted in U.S. Pat. No. 4,830,862. Employing a mixture of calcium salts also provides a tool to manipulate the flavor/taste of the drinks. In 1985, a calcium fortified version of the cola beverage Tab® was test-marketed, employing a blend of calcium carbonate, calcium chloride, and calcium saccharin, which also functioned as a sweetener.

The present invention now provides beverage concentrates and beverages comprising a unique blend of calcium salts chosen from calcium chloride and at least two of monocalcium phosphate, calcium hydroxide, and calcium carbonate. This unique blend of calcium salts imparts cleaner tastes in cola beverages and was judged by experienced cola beverage users as very close to that of the unfortified drink. In addition, juice and tea beverages comprising this unique blend of calcium salts were judged by trained tasters to have a taste comparable to, if not better than, corresponding unfortified beverages. Thus, it is another objective of the invention to provide calcium-supplemented beverage concentrates and beverages containing a unique blend of calcium salts as the source of calcium which are capable of delivering a nutritionally significant amount of calcium per 8 oz serving with good taste.

These and additional objects and advantages of the present invention are shown from the description below.

The disclosures of the patents and publications cited above and throughout this specification are incorporated in their entirety to more fully describe the invention and to demonstrate the state of the art.

SUMMARY OF THE INVENTION

The present invention provides a method for preparing a stable, artificially-sweetened, calcium-supplemented beverage concentrate which comprises forming a stabilized solution of one or more calcium salts and one or more edible acids in water and subsequently adding an artificial sweetener to the stabilized solution to form the beverage concentrate.

This invention further provides a method for preparing a stable, artificially-sweetened calcium-supplemented beverage concentrate which comprises:
  a) preparing a first solution or dispersion of one or more calcium salts and water;
  b) adding one or more edible acids to the first solution or dispersion to form a second solution wherein the one or more calcium salts and one or more edible acids are fully dissolved in solution;
  c) adding an artificial sweetener to the second solution to form a third solution wherein the one or more calcium salts, one or more edible acids and artificial sweetener are fully dissolved in solution; and
  d) optionally adding additional edible ingredients; thereby forming the beverage concentrate.

This invention also provides a beverage composition comprising calcium, artificial sweetener, and one or more edible acids which is a stable solution and exhibits effective sweetness. Certain preferred embodiments of the present invention comprise cola, juice, tea and water beverages comprising calcium, artificial sweetener and one or more edible acids.

This invention further provides a calcium-supplemented beverage concentrate comprising as the calcium source calcium chloride and at least two calcium salts chosen from monocalcium phosphate, calcium hydroxide, and calcium carbonate.

DETAILED DESCRIPTION OF THE INVENTION

The present invention provides a unique process for incorporating calcium salts in artificially-sweetened beverages and beverage concentrates. In particular, the invention allows for calcium supplementation of carbonated and non-carbonated soft drinks, as well as for juice, tea and water beverages, to achieve a manufacturable, palatable and stable product through a well-balanced beverage matrix containing calcium salts, acids, sweeteners and optional flavors. The calcium salts selected are economical and commercially available, clean in taste and are soluble under manufacturing conditions. The acids selected not only provide optimal pH for microstability but also can balance the sweet/tart ratio for desirable taste. The sweetener or sweetener blends selected provide a longer shelf life for beverages. The flavors used are stable and compatible with mineral, sweetener and acid in the beverage matrix and can comprise either primary flavors solely or binary flavor mixtures including primary flavors and a secondary flavor or top note. The beverage matrix may also contain a preservative system, which, augmented with carbonation and low pH, enhances microstability. Each of these elements is described more fully below.

The beverages provided by this invention are intended to provide a nutritionally significant amount of calcium per serving. However, due to the limited solubility of certain sources of calcium, addition of edible acids is typically required to effect dissolution of calcium in beverage concentrates at levels useful to achieve nutritionally significant amounts of calcium in full strength beverages. Although the presence of the acids provides the benefit of lowering the pH to provide microstability, the excess amounts of acid added can have a negative impact on the taste of a beverage. Therefore, a balance must be struck to provide the desired calcium content in a palatable beverage.

Additional problems are presented when the calcium fortified beverage composition is intended to be artificially sweetened. Certain artificial sweeteners, in particular, peptide-based sweeteners, are known to be effective as sweeteners only at certain low pH levels and the addition of calcium salts to beverage compositions has the effect of raising the pH. Thus, additional acid is required to not only dissolve the calcium salt but to effect a proper pH to allow for the use of such artificial sweeteners and to provide for microstability.

It has now been determined that in addition to these ingredient requirements, a crucial aspect to forming a stable calcium-supplemented, acid-stabilized and palatable composition is the timing of the addition of the artificial sweetener during the formulation process. In particular, if the artificial sweetener is added to a beverage concentrate prior to the formation of a stable solution of calcium and any required acids or acid-containing ingredients, the resulting solution will not be sweet, and the calcium salts may not fully dissolve into solution.

The present invention, therefore, provides a method for preparing a stable, artificially-sweetened, calcium-supplemented beverage concentrate which comprises forming a stabilized solution of one or more calcium salts and one or more edible acids in water and subsequently adding an artificial sweetener to the stabilized solution to form the beverage concentrate.

The terms "stabilized solution" or "stable solution" are used interchangeably throughout. Thus, for example, in a stabilized solution of one or more calcium salts in water and one or more edible acids, the salts and acid are substantially dissolved in the water resulting in a solution that appears clear at ambient temperatures and has no precipitate. As an additional example, a stabilized solution comprising a cola flavoring or caramel or similar colorant comprise no visible sediment or precipitate at ambient temperatures. One of ordinary skill in this art will readily recognize, however, that minor sedimentation may occur in any finished beverage which contains certain additional ingredients such as juice, tea solids or the like.

The preferred water contemplated for forming the beverage concentrates of this invention is "treated water", which refers to water that has been treated to remove substantially all mineral content of the water prior to supplementation with calcium as disclosed herein. Methods of producing treated water are known to those of ordinary skill in the art and include deionization, distillation, filtration and reverse osmosis ("R-O"), among others. The terms "treated water", "purified water", "demineralized water", "distilled water" and "R-O water" are understood to be synonymous herein, referring to water from which substantially all mineral content has been removed, typically containing no more than about 250 ppm total dissolved solids.

The terms "beverage concentrate" and "syrup" are used interchangeably throughout this specification. The beverage concentrates contemplated are prepared with an initial volume of water to which the additional ingredients are added. Full strength beverage compositions are formed from the beverage concentrate by adding further volumes of water to the concentrate. Full strength beverages can be prepared from the concentrates formed herein by combining approximately 1 part concentrate with between approximately 3 to approximately 7 parts water. In a preferred embodiment the full strength beverage is prepared by combining 1 part concentrate with 5 parts water. In a preferred embodiment, the additional water used to form the full strength beverages is carbonated water.

In certain other embodiments, a full strength beverage is directly prepared without the formation of a concentrate and subsequent dilution.

The amount of calcium contained in the calcium supplemented beverages of the invention is limited only by the solubility limits of calcium salt(s) used. Thus, the amount of calcium used in the compositions of the present invention is an amount sufficient to provide a nutritionally significant amount of calcium, which is understood to be an amount at least about 1% of the U.S. Recommended Daily Value ("RDV") of calcium per serving of the beverage (i.e., about 10 mg Ca/8 oz.), up to the solubility limit of the particular calcium salt(s) used. In a preferred embodiment, calcium salt(s) is added in an amount sufficient to provide about 10% U.S. RDV of calcium per serving. The present U.S. RDV of calcium is 1000 mg.

In the practice of the methods of the invention, the calcium source can comprise one or more calcium salts which are typically either salts of organic or inorganic acids. Examples of suitable calcium salts include calcium hydroxide, calcium carbonate, calcium sulfate, calcium chloride, mono-calcium phosphate, di-calcium phosphate, tri-calcium phosphate, calcium saccharin, calcium glycerophosphate, calcium citrate, calcium malate, calcium maleate, calcium tartrate, calcium succinate, calcium gluconate, calcium lactate, calcium fumarate, calcium benzoate, calcium sorbate, and mixtures thereof. Suitable calcium salts also include salts produced by mixtures of calcium hydroxide and citric or malic acids, to produce for example calcium citrate malate. However, calcium citrate malate may not provide a desirable taste when used in cola flavored beverages. Further, although the monocalcium, dicalcium and tricalcium phosphate salts are useful calcium salts for the methods and compositions of the invention, these calcium salts may be less desirable in certain formulations based on their unfavorable solubility profile. However, as explained more fully below, small amounts of monocalcium phosphate in connection with other calcium salts does provide a useful source of calcium for the calcium-supplemented beverages and beverage concentrates of this invention.

In the practice of the invention, suitable edible acids include, but are not limited to, phosphoric acid, citric acid, adipic acid, ascorbic acid, lactic acid, malic acid, fumaric acid, gluconic acid, succinic acid, tartaric acid, maleic acid, and mixtures thereof. In a preferred embodiment, phosphoric acid is the sole acid or among the acids used in the formulation.

The particular acid or acids chosen and the amount used will depend, in particular, on the type of calcium salt used, the acid's efficacy on calcium salt solubility, as well as effects on the beverage pH, titratable acidity, and taste. Those skilled in the art recognize that when preparing artificially sweetened beverage compositions, in particular those containing peptide-based artificial sweeteners such as aspartame, the resulting beverage composition must be maintained below a certain pH to retain the sweetening effect of the artificial sweetener. In the formation of calcium-supplemented beverages, the presence of calcium salts increases the pH which requires additional acids to both assist the dissolution of the salt and maintain a desirable pH for stability of the artificial sweetener. The presence of the additional acid in the beverage composition, which increases the titratable acidity of the composition, will result in a more tart or sour taste to the resulting beverage, which may be undesirable in certain formulations. Those of ordinary skill in the art will therefore recognize that the amount of acid used in the methods and beverage compositions can be readily determined based on the solubility of the calcium salt used and the taste profile desired of the resulting beverage concentration.

Artificial sweeteners useful in the methods and beverage compositions of the invention can be any of the known artificial sweeteners which are readily available and include blends of various such sweeteners. Such artificial sweeteners include peptide and non-peptide based artificial sweeteners and mixtures thereof. Peptide based sweeteners include, for example, aspartame, neotame, and alitame. Non-peptide based sweeteners include, for example, sodium saccharin, calcium saccharin, acesulfame potassium, sodium cyclamate, calcium cyclamate, neohesperidin, dihydrochalcone, and sucralose. Although useful as a sweetener for beverages made according to this invention, alitame may be less desirable for caramel-containing beverages where it has been known to form a precipitate. In a preferred embodiment, the artificial sweetener comprises aspartame. In an equally preferred embodiment, the sweetener comprises aspartame and acesulfame potassium.

In the practice of the method of the invention, the stabilized solution further may contain an optional dissolved preservative system. As noted above, larger amounts of acid are added according to the invention to enhance the solubility of the calcium salts and to maintain the sweetness of certain artificial sweeteners. Thus, the resulting solutions, with a pH typically below 4 and desirably below 3, are "microstable", i.e., resist growth of microorganisms, and suitable for storage prior to consumption without the need for further preservatives. However, an additional preservative system can be used if desired. If the additional preservative system is used, it is added to the stabilized solution prior to the addition of the artificial sweetener.

As used herein, the terms "preservation system" or "preservatives" include all preservatives approved for use in food and beverage compositions including, without limitation, such known chemical preservatives as benzoates including sodium, calcium, and potassium benzoate, sorbates including sodium, calcium, and potassium sorbate, citrates including sodium citrate and potassium citrate, polyphosphates including sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives can be used in amounts not exceeding mandated maximum levels.

The beverages of the invention can optionally contain a flavor composition, for example, fruit flavors, botanical flavors and mixtures thereof. If the flavoring composition contains acid, it is also added to the stabilized solution prior to the addition of the artificial sweetener. The acid in the acid-containing flavoring compositions can aid the solubility of calcium salts. On the contrary, artificial sweeteners such as aspartame can lower the calcium salt solubility due to the buffering effect of these compounds which will also tend to raise the pH of the beverage concentrate. Examples of acid-containing flavoring compositions include cola flavoring and citrus flavors.

As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors orange, lemon, lime, and grapefruit, and such flavors as apple, grape, cherry, and pineapple flavors and the like, and mixtures thereof. In a preferred embodiment, the beverage concentrates and beverages of the invention comprise a fruit flavor component, e.g., a juice concentrate or juice.

As used herein, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of various of the above-mentioned flavors. In a preferred embodiment, the beverage concentrates and beverages of the invention comprise a cola flavor component. In another preferred embodiment, the beverage concentrate and beverage of the invention comprise a tea flavor component.

The particular amount of the flavor component useful for imparting flavor characteristics to the beverages of the present invention will depend upon the flavor(s) selected, the flavor impression desired, and the form of the flavor component. Those skilled in the art are readily able to determine the amount of any particular flavor component(s) used to achieve the desired flavor impression.

The beverage concentrates and beverages of the invention can contain additional ingredients typically found in beverage formulations. In the practice of the methods of this invention, these additional ingredients can typically be added to the beverage concentrate after the addition of the artificial sweetener to the stabilized solution. Examples of such additional ingredients include, but are not limited to, caffeine, caramel, coloring agents or dyes, antifoam, gums, emulsifiers, tea solids, juices, cloud component, and mineral and non-mineral nutritional supplements.

Examples of non-mineral nutritional supplement ingredients are known to those of ordinary skill in the art and include, without limitation, antioxidants and vitamins, including Vitamins A, D, E (tocopherol), C (ascorbic acid), B (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices and are preferably present in amounts between about 1% to about 100% RDV, where such RDV are established. When present, the non-mineral nutritional supplement ingredient(s) is preferably present in an amount of from about 5% to about 20% RDV, where established. In a particularly preferred embodiment, the beverage compositions of the invention contain Vitamin E, optionally with Vitamin C.

Thus, the invention also provides a method for preparing a stable, artificially-sweetened calcium-supplemented beverage concentrate which comprises:

a) preparing a first solution or dispersion of one or more calcium salts and water;
b) adding one or more edible acids to the first solution or dispersion to form a second solution wherein the one or more calcium salts and one or more edible acids are fully dissolved in solution;

c) adding an artificial sweetener to the second solution to form a third solution wherein the one or more calcium salts, one or more edible acids and artificial sweetener are fully dissolved in solution; and
d) optionally adding additional edible ingredients; thereby forming the beverage concentrate.

The methods described above provide a stable artificially sweetened calcium supplemented beverage concentrate. Thus, the invention also includes a stable artificially sweetened calcium supplemented beverage concentrate and a full strength artificially sweetened calcium supplemented beverage produced by dissolving the beverage concentrate with water. Finally, the invention also provides a beverage composition comprising calcium, artificial sweetener, and edible acids which is stable and exhibits effective sweetness.

Finally, the present invention also provides a calcium fortified beverage composition comprising a unique combination of calcium salts. Specifically, the beverage compositions of the present invention are capable of delivering a nutritionally significant amount of calcium per serving by using as the source of calcium a blend of calcium salts comprising calcium chloride and at least two additional calcium salts chosen from monocalcium phosphate, calcium carbonate, and calcium hydroxide.

In a preferred embodiment, the calcium-fortified beverages of the invention deliver 10% or more of the recommended daily value (RDV) of calcium ions. Thus, at the 10% RDV level, a typical full strength beverage will contain about 100 mg of calcium ion per 8 oz serving (236.56 mL), or about 0.042% (w/w) per 1 liter. Depending on the percentage of calcium ion in a given calcium salt, this requirement could mean, for example, adding 0.0777% (w/w) of calcium hydroxide (54% w/w calcium ion) per 1 liter of finished full strength beverage.

As noted above, soft drink beverages are typically formed by mixing concentrated syrups with water. In a preferred embodiment of this invention, the ratio is 1 part syrup plus 5 parts water. Therefore, in order to deliver 10% RDV calcium in a full strength beverage composition, the beverage concentrate or syrup must contain 60% RDV, or for example, 0.4662% for calcium hydroxide. However, due to the poor solubility of calcium salts (e.g. 0.185% for calcium hydroxide), it is difficult to produce a totally soluble syrup which contains 60% RDV of calcium ions.

Thus, the key challenges involved in making a good tasting, 10% RDV calcium ion-containing cola-flavored drink are to have 60% RDV calcium ions in soluble salt form in syrup and to cause little or no alteration of the flavor and taste of the current products.

In a preferred embodiment, the beverage compositions of the invention are cola-flavored beverages. In the production of cola beverages, phosphoric acid is the preferred acidulent, providing taste and microstability characteristics to the final beverage. It has been found that when forming calcium-fortified cola beverages, calcium hydroxide ($Ca(OH)_2$) and calcium carbonate ($CaCO_3$) react with phosphoric acid in the cola syrup to form calcium phosphate. Subject to the ratio between calcium hydroxide/carbonate and phosphoric acid and the manufacture process, the resultant phosphates may include monocalcium phosphate (MCP), dicalcium phosphate and/or tricalcium phosphate. Because there is usually more phosphoric acid than either calcium hydroxide or calcium carbonate on molecular weight basis, and because the dissociation constant $K_1$ of phosphoric acid is 10,000 times greater than $K_2$ and $K_3$, monocalcium phosphate is the predominant phosphate formed. (See, Vogel's Textbook of Quantitative Chemical Analysis, 5th ed., Longman Scientific & Technical, 1989, p. 276). Thus, whichever of the three MCP-forming calcium salts (i.e. calcium hydroxide, calcium carbonate and monocalcium phosphate) is employed, monocalcium phosphate is the analyzable calcium salt in drinks containing phosphoric acid.

It would be suspected that beverages containing the same analyzable calcium salts at the same concentration would be expected to taste the same. Surprisingly, it has been found this is not the case, but that a composition comprising at least calcium hydroxide, calcium carbonate, and calcium chloride imparted a taste cleaner and closer to the unfortified drink, as compared with a blend of calcium hydroxide and calcium chloride alone or calcium carbonate and calcium chloride alone. Additionally, it has been found that a blend comprising calcium hydroxide, monocalcium phosphate and calcium chloride, or calcium carbonate, monocalcium phosphate, and calcium chloride, also impart a cleaner and closer taste to that of the unfortified drink, as compared to the regimens comprised of only calcium hydroxide and calcium chloride alone, or calcium carbonate and calcium chloride alone. Furthermore, we found that a composition comprising the three moncalcium phosphate-forming salts plus calcium chloride also imparted a very good taste.

Thus, in separately preferred embodiments, the calcium-fortified beverage concentrate or beverage of the invention comprises as the source of calcium (i) a blend of monocalcium phosphate, calcium carbonate and calcium chloride, (ii) a blend of monocalcium phosphate, calcium hydroxide and calcium chloride, (iii) a blend of calcium carbonate, calcium hydroxide and calcium chloride, or (iv) a blend of monocalcium phosphate, calcium carbonate, calcium hydroxide and calcium chloride.

The beverage and beverage concentrate compositions comprising the described unique blend of calcium salts can also comprise the additional ingredients described above including purified water, sweeteners, edible acids, flavor compositions, preservative systems, caffeine, caramel, color agents, dyes, antifoam, and mineral or non-mineral nutritional supplements. The sweeteners used in the beverages can comprise any natural and artificial sweetener known to be useful in edible compositions. If artificial sweeteners are used, the beverage and beverage concentrate compositions comprising the unique blend of calcium salts are preferably prepared according to the methods described above for producing calcium-supplemented artificially-sweetened beverages and beverage compositions. However, other methods known to be useful for forming beverage compositions may be used to make the beverage and beverage compositions comprising the unique blend of calcium salts.

The examples which follow are intended as an illustration of certain preferred embodiments of the invention, and no limitation of the invention is implied.

EXAMPLE 1

Four caffeine-free diet cola formulas were prepared using different calcium salts to provide 100 mg of elemental calcium per 240 ml of beverage. Table 1 provides the quantity of the ingredients required to produce one liter of syrup. Beverages were made into 10 oz. glass bottles by diluting 50 ml of syrup with 250 ml of carbonated water with 4.5 volumes of $CO_2$.

TABLE 1

| Syrup Composition | Formula 1 | Formula 2 | Formula 3 | Formula 4 |
|---|---|---|---|---|
| Potassium Benzoate/Sodium Benzoate (*) | 1.57 g | 1.57 g | 1.41 g | 1.02 g* |
| Caramel | 0.47 g | 0.47 g | 0.47 g | |
| Phosphoric Acid 80% | 16.34 g | 16.34 g | 16.34 g | 14.58 g |
| Citric Acid | 0.29 g | 0.29 g | 2.19 g | 2.93 g |
| Aspartame | 3.21 g | 3.21 g | 1.24 g | 1.80 g |
| Acesulfame Potassium | | | 0.3 g | 0.57 g |
| Calcium Saccharin | | | 0.59 g | |
| Antiform | 1.11 g | 1.11 g | 1.11 g | 1.11 g |
| Cola Flavor** | 11.34 g | 11.34 g | 11.34 g | 21.90 g |
| Lemon Flavor | | 3.30 ml | | |
| Calcium Hydroxide | 4.99 g | 4.99 g | 4.95 g | 4.99 g |
| Treated Water to | 1000 ml | 1000 ml | 1000 ml | 1000 ml |

*Where indicated sodium benzoate was substituted for potassium benzoate.
**Typical commercial cola flavor available from flavor manufacturers.

All formulas shown above were formulated to a pH of 3.1–3.2, titratable acidity of 30–35 and 3.4 $CO_2$ level to insure beverage microstability.

Procedure of making syrup:
1. Add 750 ml of treated water to a pre-calibrated 1 liter beaker;
2. Add acids;
3. Add calcium hydroxide and dissolve with the aid of a mixer;
4. Pre-dissolve potassium benzoate/sodium benzoate in 100 ml of treated water and add to step 3;
5. Add sweeteners and dissolve with the aid of a mixer;
6. Add flavors;
7. Add antifoam;
8. Add treated water and bring volume to 1000 ml.

Procedure of making full strength beverages:
1. Add 50 ml of syrup into a 10 oz. glass bottle containing 250 ml of carbonated water at a CO2 volume of 4.5;
2. Cap and mix the syrup into the carbonated water by shaking the contents.

Formula 1 was formulated to achieve a calcium fortified beverage using acids to not only totally solublize calcium hydroxide but also to lower the beverage pH to 3.1–3.2. The amount of acid added is higher than the typical amount present in a diet cola formula. Aspartame sweetener was added at a level to balance the sweet to tart ratio to achieve palatability. This beverage is pleasant in taste with a slight tartness.

Formula 2 is identical to formula 1 with the addition of lemon flavor added to formula 2 to create a halo effect making the tartness as part of the taste profile of a diet lemon cola.

Formula 3 contains a sweetener blend consisting of aspartame, acesulfame potassium and calcium saccharin to provide a sweetness profile more suitable to the tartness generated by the acids used in formula 1. Calcium saccharin served not only as a sweetener but also a calcium source. The sweetness from the 3-way sweetener blend can prolong the shelf life of beverages made with this formula.

Formula 4 contains a sweetener blend consisting of aspartame and acesulfame potassium plus a more robust type of cola flavor to produce a high flavor impact to prolong the shelf life of beverages made with this formula.

EXAMPLE 2

Additional calcium salts were substituted for calcium hydroxide in formula 2 above to test the finished formulation's desirability based on solubility of calcium salt, taste, cost, or manufacturability. Each of the calcium salts was added in an amount to deliver 100 mg of calcium per 240 ml of beverage. From the data in Table 2, calcium hydroxide and calcium sulfate were more desirable than other calcium salts with calcium hydroxide being the more desirable. Calcium saccharin can be used not only to provide calcium but also as an artificial sweetener.

TABLE 2

| Calcium Salt | Solubility | Taste | Others |
|---|---|---|---|
| Calcium Hydroxide | Soluble in syrup with acid | Clean | Highest Calcium density |
| Calcium Sulfate | Not soluble in syrup but soluble in beverage | Clean | |
| Mono-calcium phosphate | Poor | | |
| Di-calcium phosphate | Very poor | | |
| Tri-calcium phosphate | Very poor | | |
| Calcium saccharin | Soluble | Typical artificial sweetener taste | Can be used as a sweetener as well |
| Calcium Gluconate | Soluble | | Low calcium density |
| Calcium Glycero-phosphate | Soluble | | Low calcium density High cost |
| Calcium Lactate | Soluble | Off taste | |
| Calcium Citrate | Very Poor | | |
| Calcium Carbonate | Soluble in syrup with acid | Clean | Carbonation generation, Manufacturability issue |

EXAMPLE 3

A beverage concentrate comprising a blend of calcium hydroxide and calcium sulfate was formed by combining the following ingredients in 800 ml water according to the methods described herein and then additional water was added to a final volume of 1 L:
- 1.4 g. Potassium Benzoate
- 0.48 g. Caramel
- 15.00 g. Phosphoric Acid, 80%
- 0.30 g. Citric Acid
- 3.18 g. Aspartame
- 0.60 g. Caffeine
- 1.10 g. Antifoam
- 11.35 g. Cola Flavor
- 4.30 g. Calcium Hydroxide
- 1.11 g. Calcium Sulfate Dihydrate

EXAMPLE 4

A beverage concentrate comprising a blend of calcium Hydroxide, calcium chloride, and calcium sulfate was formed by combining the following ingredients in 800 ml water according to the methods described herein and then additional water was added to a final volume of 1 L:
- 1.4 g. Potassium Benzoate
- 0.48 g. Caramel
- 10.11 g. Phosphoric Acid, 80%
- 0.30 g. Citric Acid
- 3.18 g. Aspartame
- 0.60 g. Caffeine
- 1.10 g. Antifoam
- 11.35 g. Cola Flavor
- 3.11 g. Calcium Hydroxide
- 1.11 g. Calcium Sulfate Dihydrate
- 1.40 g. Calcium Chloride

EXAMPLE 5

A beverage concentrate comprising a blend of monocalcium phosphate, calcium chloride, and calcium sulfate was formed by combining the following ingredients in 800 ml water according to the methods described herein and then additional water was added to a final volume of 1 L:
- 1.4 g. Potassium Benzoate
- 0.48 g. Caramel
- 3.66 g. Phosphoric Acid, 80%
- 0.30 g. Citric Acid
- 3.18 g. Aspartame
- 0.60 g. Caffeine
- 1.10 g. Antifoam
- 11.35 g. Cola Flavor
- 1.11 g. Calcium Sulfate Dihydrate
- 1.85 g. Calcium Chloride
- 10.60 g. Mono Calcium Phosphate Mono Hydrate

EXAMPLE 6

A beverage concentrate comprising a blend of dicalcium phosphate, calcium chloride, and calcium sulfate was formed by combining the following ingredients in 800 ml water according to the methods described herein and then additional water was added to a final volume of 1 L:
- 1.4 g. Potassium Benzoate
- 0.48 g. Caramel
- 7.60 g. Phosphoric Acid, 80%
- 0.30 g. Citric Acid
- 3.18 g. Aspartame
- 0.60 g. Caffeine
- 1.10 g. Antifoam
- 11.35 g. Cola Flavor
- 1.11 g. Calcium Sulfate Dihydrate
- 1.85 g. Calcium Chloride
- 5.53 g. Di Calcium Phosphate, Anhydrous

EXAMPLE 7

A beverage concentrate comprising a blend of calcium hydroxide, calcium chloride, calcium citrate, and calcium sulfate was formed by combining the following ingredients in 800 ml water according to the methods described herein and then additional water was added to a final volume of 1 L:
- 1.4 g. Potassium Benzoate
- 0.48 g. Caramel
- 14.08 g. Phosphoric Acid, 80%
- 0.30 g. Citric Acid
- 3.18 g. Aspartame
- 0.60 g. Caffeine
- 1.10 g. Antifoam
- 11.35 g. Cola Flavor
- 2.63 g. Calcium Hydroxide 1.11 g. Calcium Sulfate Dihydrate
1.85 g. Calcium Chloride
1.20 g. Calcium Citrate.4H$_2$O

EXAMPLE 8

A beverage composition comprising a blend of calcium hydroxide calcium chloride by combining the following ingredients in 800 ml water according to the methods described herein and then additional water was added to a final volume of 1 L:
1.4 g. Potassium Benzoate
0.48 g. Caramel
10.11 g. Phosphoric Acid, 80%
0.30 g. Citric Acid
3.18 g. Aspartame
0.60 g. Caffeine
1.10 g. Antifoam
11.35 g. Cola Flavor
3.11 g. Calcium Hydroxide
2.59 g. Calcium Chloride

EXAMPLE 9

A beverage concentrate comprising a blend of calcium chloride, and mono calcium phosphate was formed by combining the following ingredients in 800 ml water according to the methods described herein and then additional water was added to a final volume of 1 L:
1.4 g. Potassium Benzoate
0.48 g. Caramel
2.34 g. Phosphoric Acid, 80%
0.30 g. Citric Acid
3.18 g. Aspartame
0.60 g. Caffeine
1.10 g. Antifoam
11.35 g. Cola Flavor
2.22 g. Calcium Chloride
11.41 g. Mono Calcium Phosphate Mono Hydrate

EXAMPLE 10

A beverage concentrate comprising a blend of calcium chloride and dicalcium phosphate was formed by combining the following ingredients in 800 ml water according to the methods described herein and then additional water was added to a final volume of 1 L:
1.4 g. Potassium Benzoate
0.48 g. Caramel
5.56 g. Phosphoric Acid, 80%
0.30 g. Citric Acid
3.18 g. Aspartame
0.60 g. Caffeine
1.10 g. Antifoam
11.35 g. Cola Flavor
2.22 g. Calcium Chloride
7.2 g. Di Calcium Phosphate

EXAMPLE 11

A beverage concentrate comprising a blend of mono calcium phosphate, calcium chloride, and dicalcium phosphate was formed by combining the following ingredients in 800 ml water according to the methods described herein and then additional water was added to a final volume of 1 L:
1.4 g. Potassium Benzoate
0.48 g. Caramel
5.4 g. Phosphoric Acid, 80%
0.30 g. Citric Acid
3.18 g. Aspartame
0.60 g. Caffeine
1.10 g. Antifoam
11.35 g. Cola Flavor
2.22 g. Calcium Chloride
7.34 g. Mono Calcium Phosphate Mono Hydrate
2.79 g. Di Calcium Phosphate, Anhydrous

EXAMPLE 12

A beverage concentrate comprising a blend of calcium carbonate, calcium chloride, and calcium sulfate was formed by combining the following ingredients in 800 ml water according to the methods described herein and then additional water was added to a final volume of 1 L:
1.4 g. Potassium Benzoate
0.48 g. Caramel
9.6 g. Phosphoric Acid, 80%
0.3 g. Citric Acid
3.18 g. Aspartame
0.6 g. Caffeine
1.11 g. Antifoam
11.35 g. Cola Flavor
1.11 g. Calcium Sulfate Dihydrate
1.85 g. Calcium Chloride
4.322 g. Calcium Carbonate

EXAMPLE 13

A beverage concentrate comprising a blend of calcium hydroxide, calcium chloride, and calcium carbonate was formed by combining the following ingredients in 800 ml water according to the methods described herein and then additional water was added to a final volume of 1 L:
1.4 g. Potassium Benzoate
0.48 g. Caramel
12.02 g. Phosphoric Acid, 80%
0.3 g. Citric Acid
3.18 g. Aspartame
0.6 g. Caffeine
1.11 g. Antifoam
11.35 g. Cola Flavor
3.11 g. Calcium Hydroxide
1.85 g. Calcium Chloride
0.665 g. Calcium Carbonate

EXAMPLE 14

A beverage concentrate comprising a blend of mono calcium phosphate, calcium chloride, and calcium carbonate was formed by combining the following ingredients in 800 ml water according to the methods described herein and then additional water was added to a final volume of 1 L:
1.4 g. Potassium Benzoate
0.48 g. Caramel
4.25 g. Phosphoric Acid, 80%
0.3 g. Citric Acid
3.18 g. Aspartame
0.6 g. Caffeine
1.11 g. Antifoam
11.35 g. Cola Flavor
1.85 g. Calcium Chloride
8.16 g. Mono Calcium Phosphate Mono Hydrate
1.62 g. Calcium Carbonate All above beverage concentrate formulas of Examples 3–14 form 1 liter of syrup. Final full strength beverages can be prepared from these syrups at a 1 plus 5 throw (1 part of beverage concentrate plus 5 parts of carbonated water).

EXAMPLE 15

The following ingredients were combined to form a cola-flavored beverage syrup:

2.81 g. Potassium benzoate
1.33 g. Calcium carbonate
  (1% RDV; 0.0665% (w/w) in syrup; 0.011% (w/w) in beverage)
6.22 g. Calcium hydroxide
  (6.5% RDV; 0.311% (w/w) in syrup; 0.0518% (w/w) in beverage)
3.70 g. Calcium chloride
  (2.5% RDV; 0.185% in syrup; 0.031% in beverage)
25.7 g. 80% Phosphoric acid
0.6 g. Citric acid
6.35 g. Aspartame
23 g. Cola flavor concentrate
0.96 g. Caramel
1.2 g. Caffeine
2.22 g. Antifoam
Treated water to 2 L

EXAMPLE 16

The following ingredients were combined to form a cola-flavored beverage syrup:

| | |
|---|---|
| 2.81 g. | Potassium benzoate |
| 3.24 g. | Calcium carbonate |
| | (2.5% RDV; 0.162% (w/w) in syrup; 0.027% (w/w) in beverage) |
| 16.31 g. | Monocalcium phosphate |
| | (5% RDV; 0.8155% (w/w) in syrup; 0.136% (w/w) in beverage) |
| 3.7 g. | Calcium chloride |
| | (2.5% RDV; 0.185% (w/w) in syrup; 0.031% (w/w) in beverage) |
| 10.2 g. | 80% Phosphoric acid |
| 0.6 g. | Citric acid |
| 6.35 g. | Aspartame |
| 23 g. | Cola flavor concentrate |
| 0.96 g. | Caramel |
| 1.2 g. | Caffeine |
| 2.22 g. | Antifoam |
| Treated water to 2L | |

EXAMPLE 17

The following ingredients were combined to form a cola-flavored beverage syrup:

| | |
|---|---|
| 2.81 g. | Potassium benzoate |
| 4.07 g. | Calcium hydroxide |
| | (4.25% RDV; 0.204% (w/w) in syrup; 0.339% (w/w) in beverage) |
| 10.6 g. | Monocalcium phosphate |
| | (3.25% RDV; 0.5301% (w/w) in syrup; 0.0884% (w/w) in beverage) |
| 3.7 g. | Calcium chloride |
| | (2.5% RDV; 0.185% (w/w) in syrup; 0.031% (w/w) in beverage) |
| 16.1 g. | 80% Phosphoric acid |
| 0.6 g. | Citric acid |
| 6.35 g. | Aspartame |
| 23 g. | Cola flavor concentrate |
| 0.96 g. | Caramel |
| 1.2 g. | Caffeine |
| 2.22 g. | Antifoam |
| Treated water to 2L | |

EXAMPLE 18

The following ingredients were combined to form a cola-flavored beverage syrup:

| | |
|---|---|
| 2.81 g. | Potassium benzoate |
| 3.24 g. | Calcium carbonate |
| | (2.5% RDV; 0.162% (w/w) in syrup; 0.027% (w/w) in beverage) |
| 2.40 g. | Calcium hydroxide |
| | (2.5% RDV; 0.120% (w/w) in syrup; 0.02% (w/w) in beverage) |
| 8.16 g. | Monocalcium phosphate |
| | (2.5% RDV; 0.408% (w/w) in syrup; 0.068% (w/w) in beverage) |
| 3.70 g. | Calcium chloride |
| | (2.5% RDV; 0.185% (w/w) in syrup; 0.031% (w/w) in beverage) |
| 18.7 g. | 80% Phosphoric acid |
| 0.6 g. | Citric acid |
| 6.35 g. | Aspartame |
| 23 g. | Cola flavor concentrate |
| 0.96 g. | Caramel |
| 1.2 g. | Caffeine |
| 2.22 g. | Antifoam |
| Treated water to 2L | |

Examples 13–18 show cola-flavored beverage syrup compositions containing the novel blend of calcium salts of this invention and formulated to provide 10% RDV of calcium in a full strength beverage. In Examples 15–18, the calculations for RDV for full strength beverages are based on a throw of 1 part syrup to 5 parts carbonated water.

EXAMPLE 19

A beverage concentrate comprising a blend of calcium carbonate, calcium hydroxide, monocalcium phosphate and calcium chloride was formed by combining the following ingredients in an amount of water sufficient to produce a 2 L final volume according to the methods described herein.

1.65 g. sodium benzoate 3.24 g. calcium carbonate 2.40 g. calcium hydroxide 8.16 g. monocalcium phosphate 3.70 g. calcium chloride 18.70 g. phosphoric acid (80%)

5.97 g. citric acid 6.35 g. aspartame 28.09 g. orange flavor emulsion with color The above orange flavored beverage concentrate can be used to form an orange-flavored soft drink upon 1-to-5 dilution and a carbonation level of 2.10.

EXAMPLE 20

A beverage comprising a blend of calcium carbonate, calcium hydroxide, monocalcium phosphate and calcium chloride was formed by combining the following ingredients in an amount of water sufficient to produce a 2 L final volume according to the methods described herein.
- 2.81 g. potassium benzoate
- 3.24 g. calcium carbonate
- 2.40 g. calcium hydroxide
- 8.16 g. monocalcium phosphate
- 3.70 g. calcium chloride
- 18.70 g. phosphoric acid (80%)
- 0.60 g. citric acid
- 6.35 g. aspartame
- 5.40 g. peach/papaya flavor
- 7.04 g. peach/papaya color
- 20.8 g. cloud component
- 123.0 g. pearjuice component (5%)

EXAMPLE 21

A water beverage comprising a blend of calcium sulfate dihydrate, calcium chloride and monocalcium phosphate monohydrate was formed by combining the following ingredients in an amount of water sufficient to produce a 6 L final volume according to the methods described herein.
- 1.4 g. potassium benzoate
- 1.11 g. calcium sulfate dihydrate
- 1.85 g. calcium chloride
- 10.6 g. monocalcium phosphate monohydrate
- 5.57 g. phosphoric acid (80%)
- 0.3 g. citric acid
- 3.18 g. aspartame

EXAMPLE 22

A beverage comprising a blend of calcium carbonate, calcium hydroxide, monocalcium phosphate and calcium chloride was formed by combining the following ingredients in an amount of water sufficient to produce a 2 L final volume according to the methods described herein.
- 0.36 g. sodium benzoate
- 0.406 g. potassium sorbate
- 1.01 g. sodium hexametaphosphate
- 0.54 g. calcium carbonate
- 0.4 g. calcium hydroxide
- 1.36 g. monocalcium phosphate
- 0.62 g. calcium chloride
- 3.3 g. phosphoric acid (85%)
- 5.0 g. citric acid
- 0.6 g. antifoam
- 1.058 g. aspartame
- 2.2 g. tea color and powder
- 1.0 g. lemon flavor Other variations and modifications of this invention will be obvious to those skilled in this art. This invention is not to be limited except as set forth in the following claims.

What is claimed is:

1. A method for preparing a stable, artificially-sweetened, calcium-supplemented beverage concentrate which comprises forming a stabilized solution of a calcium source comprising calcium chloride and monocalcium phosphate, and at least one of calcium hydroxide and calcium carbonate, and one or more edible acids in water and subsequently adding an artificial sweetener to the stabilized solution to form the beverage concentrate, wherein the beverage concentrate consists essentially of water, the calcium source, the one or more edible acids, the artificial sweetener and optionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

2. The method of claim 1, wherein the one or more edible acids are chosen from the group consisting of phosphoric acid, citric acid, lactic acid, malic acid, maleic acid, adipic acid, succinic acid, fumaric acid, tartaric acid, gluconic acid, ascorbic acid and mixtures thereof.

3. The method of claim 1, wherein the artificial sweetener is chosen from the group consisting of aspartame, acesulfame potassium, neotame, alitame, sodium saccharin, calcium saccharin, sucralose, sodium cyclamate, calcium cyclamate, neoheperidin, dihydrochalcone, and mixtures thereof.

4. The method of claim 3, wherein the artificial sweetener comprises aspartame.

5. The method of claim 3, wherein the artificial sweetener comprises aspartame and acesulfame potassium.

6. The method of claim 1, wherein the stabilized solution further comprises one or more preservatives dissolved in the solution prior to the addition of the artificial sweetener.

7. The method of claim 6, wherein the one or more preservatives is chosen from the group consisting of sodium benzoate, calcium benzoate, potassium benzoate, sodium sorbate, calcium sorbate, potassium sorbate, ascorbic acid, SHMP, EDTA, BHA, BHT, TBHQ, dehydroacetic acid, dimethyldicarbonate, ethoxyquin, heptylparaben, and combinations thereof.

8. The method of claim 1, wherein the stabilized solution further comprises acid-containing flavoring composition dissolved prior to the addition of the artificial sweetener.

9. The method of claim 8, wherein the acid-containing flavoring composition comprises a cola flavor.

10. The method of claim 8, wherein the acid-containing flavoring composition comprises a combination of cola flavor and lemon flavor.

11. The method of claim 8, wherein the acid-containing flavoring composition comprises a citrus flavor.

12. A beverage concentrate produced by the method of claim 1.

13. A full strength beverage produced by dissolving the beverage concentrate of claim 12 with water.

14. The full strength beverage of claim 13 comprising one part beverage concentrate and five parts water.

15. The full strength beverage of claim 13, wherein the water comprises carbonated water.

16. A method for preparing a stable, artificially-sweetened calcium-supplemented beverage concentrate which comprises:
   a) preparing a first solution or dispersion of a calcium source comprisinf calcium chloride, monocalcium phospate, and at least one of calcium hydroxide and calcium carbonate, and water;
   b) adding one or more edible acids to the first solution or dispersion to form a second solution wherein the calcium source and one or more edible acids are fully dissolved in solution;
   c) adding an artificial sweetener to the second solution to form a third solution wherein the calcium source, one or more edible acids and artificial sweetener are fully dissolved in solution; and
   d) optionally adding additional edible ingredients, thereby forming the beverage concentrate, wherein the beveraae concentrate consists essentially of water, the calcium source, the one or more edible acids, the artificial sweetener and optionally. caffeine, caramel, carbonation, coloring agents or dyes, antifoam, emulsifiers, one or more flavoring compositions, one or more preservatives, tea solids, juices, cloud component, and mineral and non-mineral nutritional supplements.

17. The method of claim 16, wherein the one or more edible acids are chosen from the group consisting of phosphoric acid, citric acid, lactic acid, malic acid, maleic acid, adipic acid, succinic acid, fumaric acid, tartaric acid, gluconic acid, ascorbic acid, and mixtures thereof.

18. The method of claim 16, wherein the artificial sweetener is chosen from the group consisting of aspartame, acesulfame potassium, neotame, alitame, sodium saccharin, calcium saccharin, sucralose, sodium cyclamate, calcium cyclamate, neohesperidin, dihydrochalcone, and mixtures thereof.

19. The method of claim 18, wherein the artificial sweetener comprises aspartame.

20. The method of claim 19, wherein the artificial sweetener further comprises acesulfame potassium.

21. The method of claim 16 further comprising dissolving one or more preservatives in the second solution such that the one or more preservatives, the calcium source, and the one or more edible acids are fully dissolved in the second solution prior to conducting step (c).

22. The method of claim 21, wherein the preservative is chosen from the group consisting of sodium benzoate, calcium benzoate, potassium benzoate, sodium sorbate, calcium sorbate, potassium sorbate, SHMP, EDTA, BHA, BHT, TBHQ, dehydroacetic acid, ascorbic acid, dimethyldicarbonate, ethoxyquin, heptylparaben, and combinations thereof.

23. The method of claim 16 further comprising dissolving one or more acid-containing flavoring compositions in the second solution such that the one or more acid-containing flavoring compositions, the calcium source, and the one or more edible acids are fully dissolved in the second solution prior to conducting step (c).

24. The method of claim 23, wherein the one or more acid-containing flavoring compositions comprise a cola flavor.

25. The method of claim 23, wherein the one or more acid-containing flavoring compositions comprise cola flavor and lemon flavor.

26. The method of claim 23, wherein the one or more acid-containing flavoring compositions comprise a citrus flavor.

27. A beverage concentrate produced by the method of claim 16.

28. A full strength beverage produced by dissolving the beverage concentrate of claim 27 with water.

29. The full strength beverage of claim 28 comprising one part beverage concentrate and five parts water.

30. The full strength beverage of claim 29, wherein the water is carbonated water.

31. A beverage composition comprising a calcium source consistiong essentially of comprising calcium chloride, monocalcium phosphate, and at least one of calcium hydroxide and calcium carbonate, artificial sweetener, and one or more edible acids which is a stable solution and exhibits effective sweetness, wherein the beverage composition consists essentially of water, the calcium source, the one or more edible acids, the artificial sweetener and optionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

32. The beverage composition of claim 31 further comprising the one or more flavoring compositions, wherein the one or more flavoring compositions comprise a cola flavor.

33. The beverage composition of claim 31 further comprising the one or more flavoring compositions, wherein the one or more flavoring compositions comprise a fruit flavor.

34. The beverage composition of claim 31 further comprising the one or more flavoring compositions, wherein the one or more flavoring compositions comprise a tea flavor.

35. A calcium-supplemented beverage concentrate composition consisting essentially of a calcium source comprising calcium chloride, monocalcium phosphate, and at least one calcium salt selected from the group consisting of calcium hydroxide and calcium carbonate, artificial sweetener, one or more edible acids, water, and optionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

36. The calcium-supplemented beverage concentrate of claim 35, wherein the calcium source comprises calcium chloride, calcium hydroxide and monocalcium phosphate.

37. The calcium-supplemented beverage concentrate of claim 35, wherein the calcium source comprises calcium chloride, monocalcium phosphate, and calcium carbonate.

38. The calcium-supplemented beverage concentrate of claim 35, wherein the calcium source comprises calcium chloride, calcium hydroxide, calcium carbonate and monocalcium phosphate.

39. The calcium-supplemented beverage concentrate of claim 35, wherein the one or more edible acids are chosen from the group consisting of phosphoric acid, citric acid, ascorbic acid, adipic acid, lactic acid, malic acid, maleic acid, succinic acid, fumaric acid, tartaric acid, gluconic acid, and mixtures thereof.

40. The calcium-supplemented beverage concentrate of claim 35, wherein the artificial sweetener is chosen from the group consisting of aspartame, acesulfame potassium, neotame, alitame, sodium saccharin, calcium saccharin, sucralose, sodium cyclamate, calcium cyclamate, neohesperidin, dihydrochalcone, and mixtures thereof.

41. The calcium-supplemented beverage concentrate of claim 40, wherein the artificial sweetener comprises aspartame.

42. The calcium-supplemented beverage concentrate of claim 40, wherein the artificial sweetener comprises aspartame and acesulfame potassium.

43. The calcium-supplemented beverage concentrate of claim 35 further comprising the one or more preservatives.

44. The calcium-supplemented beverage concentrate of claim 43, wherein the one or more preservatives is chosen from the group consisting of sodium benzoate, calcium benzoate, potassium benzoate, sodium sorbate, calcium sorbate, potassium sorbate, ascorbic acid, SHMP, EDTA, BHA, BHT, TBHQ, dehydroacetic acid, dimethyldicarbonate, ethoxyquin, heptylparaben, and combinations thereof.

45. The calcium-supplemented beverage concentrate of claim 35 further comprising the one or more flavor compositions.

46. The calcium-supplemented beverage concentrate of claim 45, wherein the flavor composition comprises cola flavor.

47. The calcium-supplemented beverage concentrate of claim 45, wherein the flavor composition comprises cola flavor and lemon flavor.

48. The calcium-supplemented beverage concentrate of claim 45, wherein the flavor composition comprises a fruit flavor.

49. The calcium-supplemented beverage concentrate of claim 45, wherein the flavor composition comprises a tea flavor.

50. A full strength beverage produced by dissolving the calcium-supplemented beverage concentrate of claim 35 with water.

51. The full strength beverage of claim 50 comprising one part calcium-supplemented beverage concentrate and five parts water.

52. The full strength beverage of claim 51, wherein the water is carbonated water.

53. A method for preparing a stable, artificially-sweetened, calcium-supplemented full strength beverage which comprises forming a stabilized solution of a calcium source comprising calcium chloride, monocalcium phosphate, and at least one of calcium hydroxide and calcium carbonate, and one or more edible acids in water and subsequently adding an artificial sweetener to the stabilized solution to form the beverage, wherein the beverage concentrate consists essentially of water, the calcium source, the one or more edible acids, the artificial sweetener and optionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

54. The method of claim 53, wherein the one or more edible acids are chosen from the group consisting of phosphoric acid, citric acid, lactic acid, malic acid, maleic acid, adipic acid, succinic acid, fumaric acid, tartaric acid, gluconic acid, ascorbic acid and mixtures thereof.

55. The method of claim 53, wherein the artificial sweetener is chosen from the group consisting of aspartame, acesulfame potassium, neotame, alitame, sodium saccharin, calcium saccharin, sucralose, sodium cyclamate, calcium cyclamate, neoheperidin, dihydrochalcone, and mixtures thereof.

56. The method of claim 53, where the stabilized solution further comprises the one or more preservatives dissolved in the solution prior to the addition of the artificial sweetener.

57. The method of claim 56, wherein the one or more preservatives is chosen from the group consisting of sodium benzoate, calcium benzoate, potassium benzoate, sodium sorbate, calcium sorbate, potassium sorbate, ascorbic acid, SHMP, EDTA, BHA, BHT, TBHQ, dehydroacetic acid, dimethyldicarbonate, ethoxyquin, heptylparaben, and combinations thereof.

58. The method of claim 53, wherein the stabilized solution further comprises acid-containing flavoring composition dissolved prior to the addition of the artificial sweetener.

59. The method of claim 58, wherein the acid-containing flavoring composition comprises a cola flavor.

60. The method of claim 58, wherein the acid-containing flavoring composition comprises a combination of cola flavor and lemon flavor.

61. The method of claim 58, wherein the acid-containing flavoring composition comprises a citrus flavor.

62. The method of claim 53, further comprising a step of adding an additional ingredient after the step of adding the artificial sweetener.

63. A full strength beverage produced by the method of claim 53.

64. A method for preparing a stable, artificially-sweetened calcium-supplemented full strength beverage which comprises:
a) preparing a first solution or dispersion of a calcium source comprising calcium chloride, monocalcium phosphate, and at least one of calcium hydroxide and calcium carbonate, and water;
b) adding one or more edible acids to the first solution or dispersion to form a second solution wherein the calcium source and one or more edible acids are fully dissolved in solution;
c) adding an artificial sweetener to the second solution to form a third solution wherein the calcium source, one or more edible acids and artificial sweetener are fully dissolved in solution; and
d) optionally adding additional edible ingredients, thereby forming the full strength beverage, wherein the full strength beverage consists essentially of water, the calcium source, the one or more edible acids, the artificial sweetener and oppionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

65. The method of claim 64, wherein the one or more edible acids are chosen from the group consisting of phosphoric acid, citric acid, lactic acid, malic acid, maleic acid, adipic acid, succinic acid, fumaric acid, tartaric acid, gluconic acid, ascorbic acid, and mixtures thereof.

66. The method of claim 64, wherein the artificial sweetener is chosen from the group consisting of aspartame, acesulfame potassium, neotame, alitame, sodium saccharin, calcium saccharin, sucralose, sodium cyclamate, calcium cyclamate, neohesperidin, dihydrochalcone, and mixtures thereof.

67. The method of claim 64 further comprising the step of dissolving one or more preservatives to the second solution such that one or more preservatives, one or more calcium, and one or more edible acids are fully dissolved in the second solution prior to conducting step (c).

68. The method of claim 67, wherein the preservative is chosen from the group consisting of sodium benzoate, calcium benzoate, potassium benzoate, sodium sorbate, calcium sorbate, potassium sorbate, SHMP, EDTA, BHA, BHT, TBHQ, dehydroacetic acid, ascorbic acid, dimethyldicarbonate, ethoxyquin, heptylparaben, and combinations thereof.

69. The method of claim 64 further comprising the step of dissolving one or more acid-containing flavoring compositions the second solution such that the one or more acid-containing flavoring compositions, calcium source, and one or more edible acids are fully dissolved in the second solution prior to conducting step (c).

70. The method of claim 69, wherein the one or more acid-containing flavoring composition comprises a cola flavor.

71. The method of claim 69, wherein the one or more acid-containing flavoring composition comprises cola flavor and lemon flavor.

72. The method of claim 69, wherein the one or more acid-containing flavoring composition comprises a citrus flavor.

73. A full strength beverage produced by the method of claim 64.

74. A calcium-supplemented beverage composition consisting essentiallu of a calcium source comprising cvalcium chloride, monocalcium phosphate and at least one calcium salt selected from the group consisting of calcium hydroxide and calcium carbonate, an artificial sweetner, one or more edible acids, water, and optionally, caffeine, caramel, carbonation, coloring agents or dyes, antifoam, emulsifiers, one or more flavoring compositions, one or more preservatives, tea solids, juices, cloud component, and mineral and non-mineral nutritional supplements.

75. The calcium-supplemented beverage of claim 74, wherein the calcium source comprises calcium chloride, calcium hydroxide and monocalcium phosphate.

76. The calcium-supplemented beverage of claim 74, wherein the calcium source comprises calcium chloride, calcium monophosphate phosphate, and calcium carbonate.

77. The calcium-supplemented beverage of claim 74, wherein the calcium source comprises calcium chloride, calcium hydroxide, calcium carbonate and monocalcium phosphate.

78. The calcium-supplemented beverage of claim 74, wherein the one or more edible acids are chosen from the group consisting of phosphoric acid, citric acid, ascorbic acid, adipic acid, lactic acid, malic acid, maleic acid, succinic acid, fumaric acid, tartaric acid, gluconic acid, and mixtures thereof.

79. The calcium-supplemented beverage of claim 74, wherein the artificial sweetener is chosen from the group consisting of aspartame, acesulfame potassium, neotame, alitame, sodium saccharin, calcium saccharin, sucralose, sodium cyclamate, calcium cyclamate, neosheperidin, dihydrochalcone, and mixtures thereof.

80. The calcium-supplemented beverage of claim 74 further comprising the one or more preservatives.

81. The calcium-supplemented beverage of claim 80, wherein the one or more preservatives is chosen from the group consisting of sodium benzoate, calcium benzoate, potassium benzoate, sodium sorbate, calcium sorbate, potassium sorbate, ascorbic acid, SHMP, EDTA, BHA, BHT, TBHQ, dehydroacetic acid, dimethyldicarbonate, ethoxyquin, heptylparaben, and combinations thereof.

82. The calcium-supplemented beverage of claim 74 further comprising the one or more flavor compositions.

83. The calcium-supplemented beverage of claim 82, wherein the flavor composition comprises cola flavor.

84. The calcium-supplemented beverage of claim 82, wherein the flavor composition comprises cola flavor and lemon flavor.

85. The calcium-supplemented beverage of claim 82, wherein the flavor composition comprises a fruit flavor.

86. The calcium-supplemented beverage of claim 82, wherein the flavor composition comprises a tea flavor.

* * * * *